Jan. 17, 1956   S. M. CLARK   2,731,061
VALVE
Filed Nov. 17, 1953   4 Sheets-Sheet 1
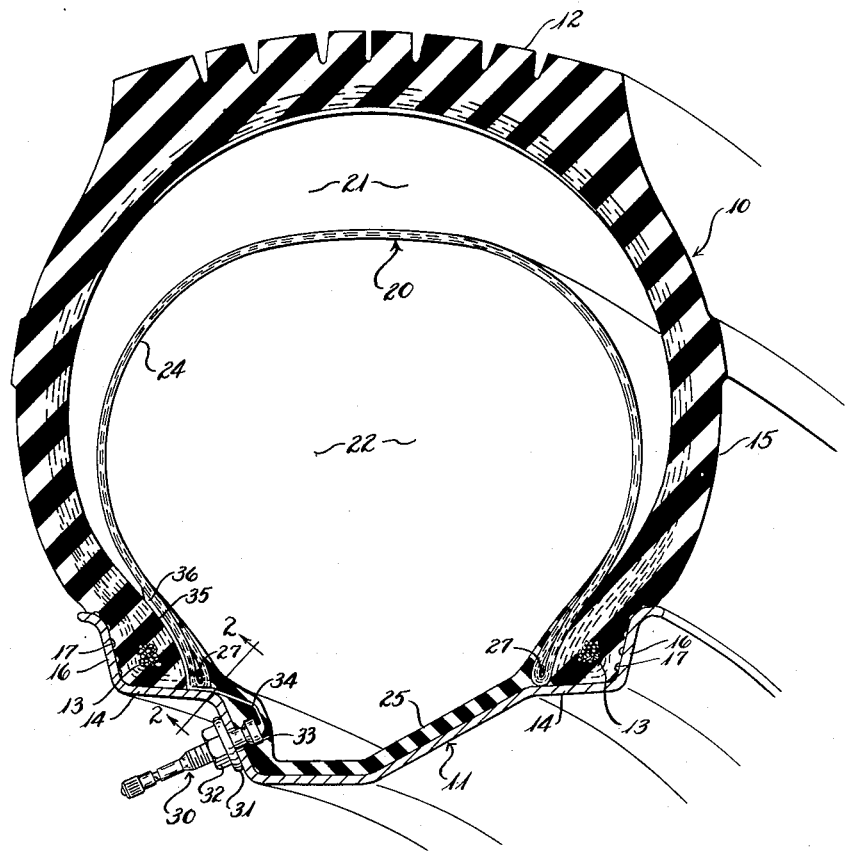
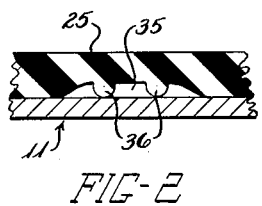
INVENTOR.
STANLEY M. CLARK
BY W. A. Fraser
ATTY.

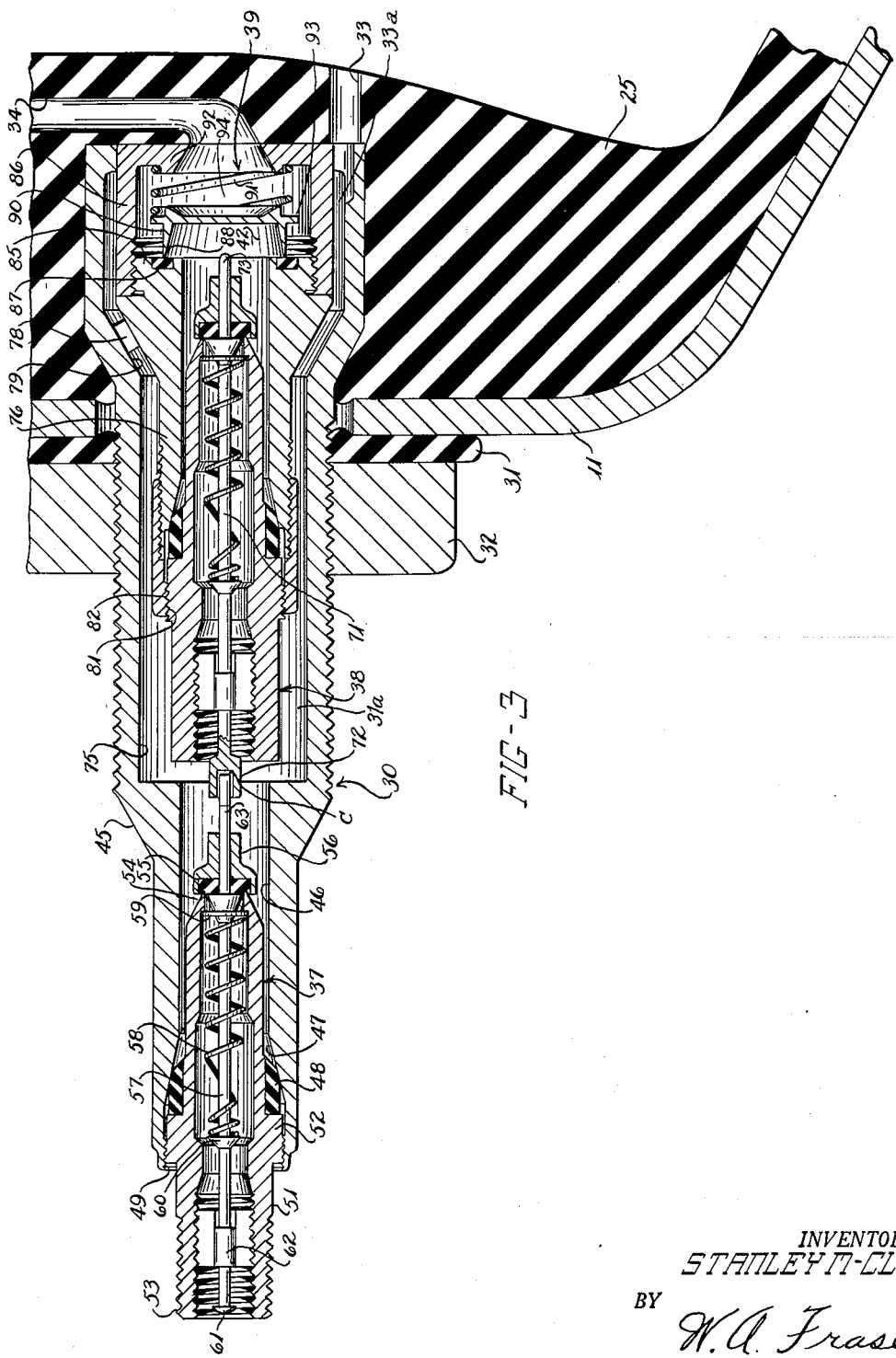

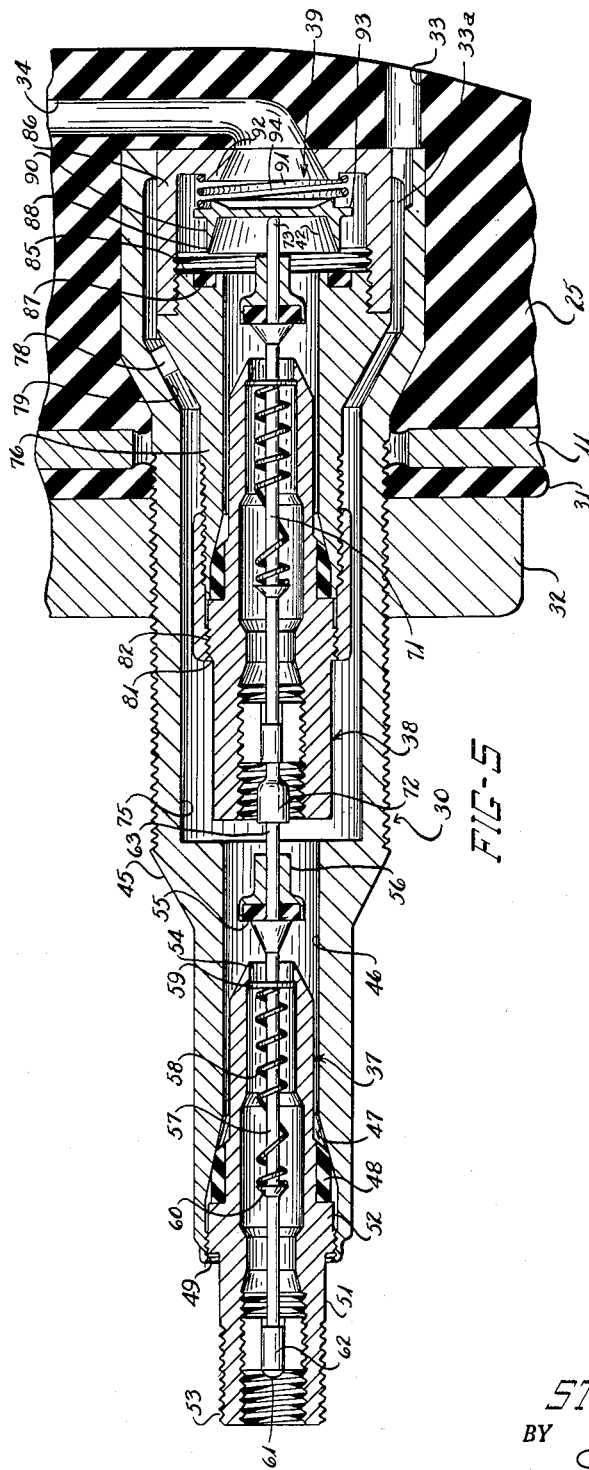

United States Patent Office 2,731,061
Patented Jan. 17, 1956

2,731,061

VALVE

Stanley M. Clark, Parma, Ohio, assignor to The Firestone Tire & Rubber Company, Akron, Ohio, a corporation of Ohio Application November 17, 1953, Serial No. 392,637

3 Claims. (Cl. 152—341)

This invention relates to tubeless tires having safety members to provide protection against blowouts, and more particularly to inflation valves for such tires.

The U. S. patent to Church, No. 2,544, 815, and the copending application of F. S. King and S. E. Petrasek, Serial No. 338,322, disclose safety members for tubeless tires which take the form of a small tube spaced from the interior walls of the tire in a manner to divide the interior of the tire into two compartments. The advantages of maintaining an air pressure within the inner compartment as defined by such a safety member or tube appreciably higher than the pressure in the outer compartment are pointed out, and in the King et al. application, one type of inflation valve which can be used to produce the desired difference in pressure is described. However, the valve shown in that application requires a careful manual adjustment of the parts each time the valve is used to produce the two pressures, and such a manual adjustment is undesirable because mistakes are likely to occur unless the users are extremely careful.

The present invention is directed towards an inflation valve adapted for use with an assembly of a tire and safety member which is virtually automatic in its operation. The valve in appearance is similar to the conventional valves which are used in the present day inner tubes and it is used in almost exactly the same way. No adjustment is required to produce the desired differential pressures. The tire is inflated by connecting the nozzle of an air line to the valve and air is introduced into the tire until the desired air pressure is obtained. In order to deflate the tire the pin which is located at the open end of the valve is depressed and air escapes freely from both compartments of the tire simultaneously. If a blowout should occur, during the operation of the tire, the two compartments are effectively cut off from communication with each other so that air is retained in the inner chamber or compartment to give support to the tire.

The preferred form of the invention comprises three separate valves located in series with each other in such a manner that during inflation, two of the valves are opened to admit air at the same pressure into a chamber. The chamber is in direct communication with the inner safety tube so that the air passes with undiminished pressure into the tube. The chamber is in communication with the outer compartment by means of a poppet valve which acts to reduce the pressure of the air passing into the outer compartment by a pre-determined amount. During operation, the first two valves remain closed to seal off communication between the two compartments and thus retain air in the inner compartment in the event of a blowout. The three valves are arranged in a manner which permits all three to open as a group to deflate the tire.

The inflation valve has an advantage of utilizing valve elements which have been engineered and tested thoroughly by the experience of many millions of users. Present tools and methods of assembling can be utilized to manufacture the valve and the valve is accordingly easy and cheap to make. At the same time, the valve operates automatically to maintain a desired differential pressure within the tire to provide effective blowout protection and to enable quick and easy deflation.

A primary object of the invention, therefore, is to provide an inflation valve for use with tires divided into two compartments for blowout safety, the valve automatically providing a greater air pressure in the inner compartment as compared with the outer compartment.

Another object is to provide such a valve which can be made easily and economically from standard valve parts.

Further objects and advantages will be more fully apparent from the following description of a preferred form of the invention, reference being had to the accompanying drawings in which:

Figure 1 is a transverse sectional view of a tubeless tire and safety member mounted on a rim, the safety member having a valve embodying the present invention.

Figure 2 is a sectional view taken as indicated by the lines 2—2 in Figure 1 and showing the passage by which the air reaches the outer compartment from the valve.

Figure 3 is a longitudinal sectional view of the valve of Figure 1, on an enlarged scale to show more clearly the details of construction, the valve being shown in closed position.

Figure 5 is a view, corresponding to Figures 3 and 4, showing the valve in the open position required for deflation of the tire.

Figure 4:
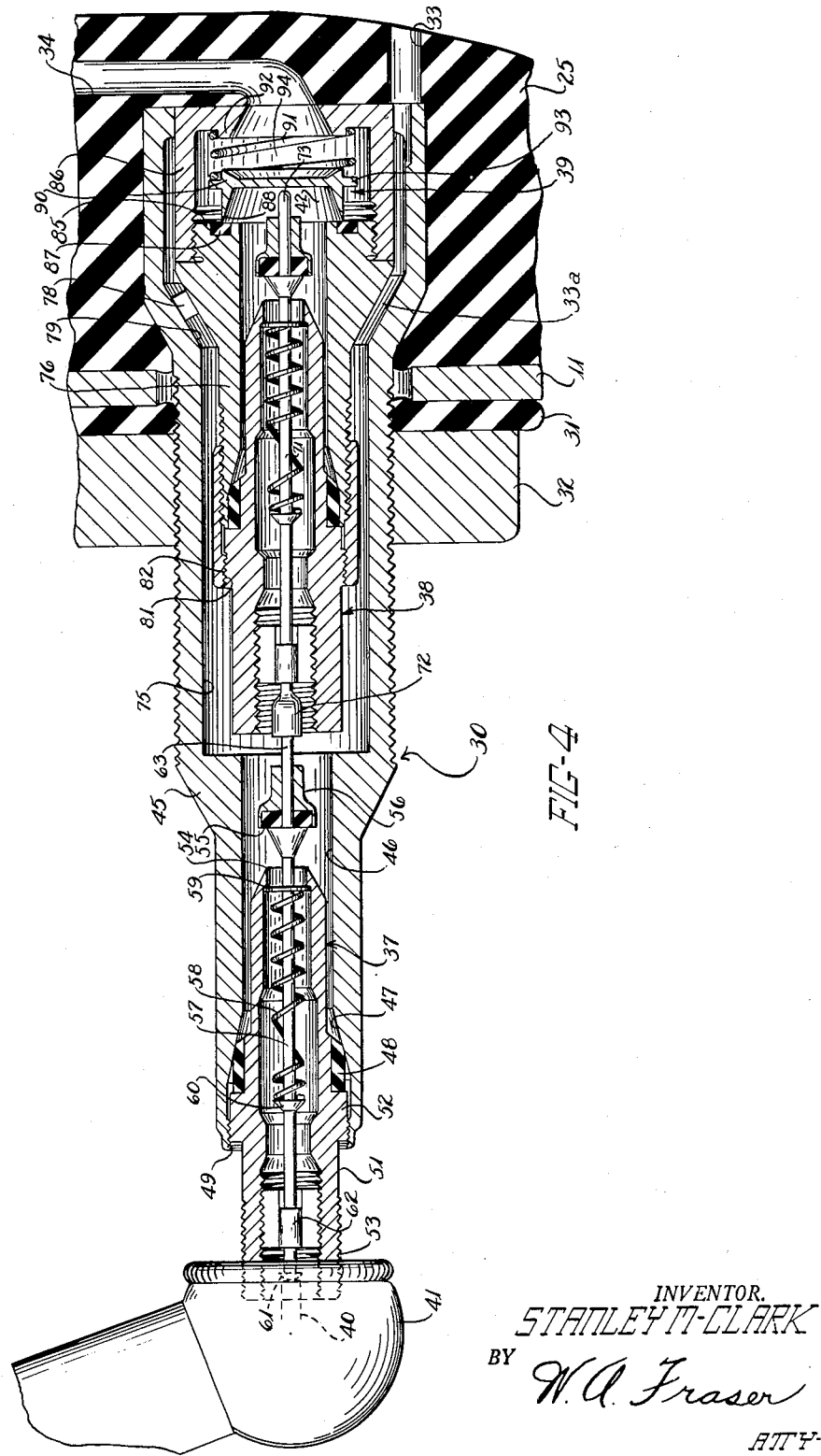
Figure 4 is a view corresponding to Figure 3, showing the valve in the open position required for inflation of the tire.

As mentioned above, the present invention is adapted for use with a safety member such as the safety tube shown in the above mentioned Church patent or that shown in the copending King application, the valve having a construction which permits the tube to be inflated to a higher air pressure than the remainder of the interior of the tire. Essentially, the inflation valve comprises three valve units arranged in series with each other in a manner such that, during inflation of the tire, two of the valves are opened mechanically by engaging the nozzle of an air line while the third valve, which takes the form of a poppet valve, opens only as a result of a difference in air pressure between the tube and the remainder of the tire. During deflation the three valve units are all opened mechanically.

Such a safety tube and valve construction is adapted for use with a tubeless tire indicated generally at 10 in Figure 1, which is mounted on a drop-center rim 11. The tire will not be described in detail for it forms no part of the present invention, but it has a conventional construction comprising the sidewalls 15, tread 12 and the bead portions 13 which seat upon the rim seats 14 and which fit snugly against the side flanges 16 of the rim. The bead portions of the tire may have the usual sealing ribs 17 to provide an air-tight seal between the tire and the rim.

In order to provide blowout protection for the tire, a tubular safety member, indicated generally at 20, is positioned within the tire in a manner to divide the interior of the tire into an outer compartment 21 and an inner comparement 22, the safety tube functioning in a manner to retain air within the inner compartment 22 in the event the tire blows out with an explosive release of air from the outer compartment 21. The safety member comprises an outer portion 24 of two-ply rubberized fabric and an inner portion 25 which preferably is of rubber but which may also be of rubberized fabric. The member 20 has inextensible beads 27 at the juncture of the inextensible fabric portion 24 with the extensible rubber portion 25, the beads 27 being adapted to seat snugly on the rim seats 14 of the rim adjacent the bead portions 13 of the tire.

The tire is inflated by means of the valve referred to above which is indicated generally at 30. The valve is vulcanized to the rubber portion 25 of the tube and extends through a hole in the rim so that it is readily accessible for inflating and deflating the tire. In order to provide a seal between the valve and the rim a rubber washer 31 is placed over the stem of the valve adjacent the rim and a compression nut 32 is threaded onto the stem of the valve, to force the washer into sealing engagement with the rim. Obviously any other convenient means for sealing the valve to the rim can be used. As shown in Figure 1, the air under pressure passes from the valve 30 into the interior of the tube 20, i. e., into compartment 22, through a passage 33 and passes into the outer compartment 21 through a passage 34 in the base of the valve and through a passage 35 between the member 20 and the bead portions of the tire 10. The passage 35 is defined by a pair of spaced ribs 36 molded into the outer surface of the tube, see Figure 2.

As will be seen, the valve 30 has a construction adapted to provide an air pressure within the compartment 22 substantially higher than the pressure in compartment 21 so that in normal use the bottom of the tube 20 is forced by the difference in pressure tightly against the rim 11. By means of this differential pressure many of the usual problems, which are encountered in safety members for tubeless tires, are overcome, for the differential pressure provides insurance against "throw-out" due to centrifugal force and prevents chafing movement of the tube within the tire.

As best shown in Figures 3-5, valve 3 generally comprises three valve units aligned in series; one valve unit, indicated generally at 37, is adapted to seal off the escape of air from the inner compartment 22, a second unit, indicated generally at 38, is adapted to seal off communication between the compartments 21 and 22 to prevent the escape of air from compartment 21, and the third unit, indicated generally at 39, comprises a spring biased poppet valve which is adapted automatically to provide a differential air pressure between the two compartments.

The valve units 37, 38 and 39 are arranged in series with each other so that when the valve unit 37 is opened by contact with a pin 40 of an inflating nozzle, such as the nozzle 41 of Figure 4, the valve element 37 will, contact and open the valve unit 38. With valves 37 and 38 open, air under pressure will pass readily into the inner compartment 22 and air under pressure will pass into the chamber 42 adjacent the poppet valve 39 and exert an opening pressure on the valve to permit air under reduced pressure to pass into the outer compartment 21. It will be noted that only the valve elements 37 and 38 are operated mechanically by the inflating nozzle 41, and that the poppet valve 39 is operated pneumatically by the air under pressure in chamber 42, this pressure being the same as that in passage 33 and compartment 22.

When it is desired to deflate the tire and remove it from the rim, the valve elements 37 and 38 are opened mechanically but are given a greater mechanical movement than is given during inflation so that unit 38 will mechanically engage the poppet valve and positively force it into open position, permitting air to escape from both compartments of the tire, see Figure 5. The details of construction of the valve 30 are not important so long as this cooperation of the three valve units can be obtained.

In the preferred form of the invention, the valves 37 and 38 are substantially identical in construction and may utilize any one of the several forms of commercial valve inserts, which are sold and used in present day tires and tubes, such as the construction shown in the U. S. patent to Broecker, No. 2,228,984.

The valve stem proper is bored and counterbored in a manner to receive the inserts. Thus the main valve stem 45 is bored as at 46 to receive valve unit 37, the bore being tapered as indicated at 47 to provide a seating surface for a gasket 48 which forms an air tight seal between valve unit or insert 37 and the valve stem 45. The end of the valve stem is threaded as at 49 to receive the external threads of the insert, the arrangement permitting the unit 37 to be inserted within the stem until the gasket 48 makes sealing contact with the tapered seat 47. The valve unit 37 comprises a tubular body 51 having an external shoulder 52 which supports the gasket 48, the gasket normally being vulcanized to the body at this point. The outer end 53 of the insert is adapted to connect with the air nozzle 41 as shown in Figure 4 and the inner end is tapered to a sharp edge as indicated at 54. The edge 54 is intended to make sealing contact with a circular rubber disc 55 mounted on a button 56 which in turn is carried by a pin 57 extending through the body 51. The disc 56 is normally urged into sealing contact with edge 54, to prevent air from passing through the insert, by a coil spring 58 compressed between an internal shoulder 59 in the body 51 and a circular flange 60 on the pin 57. The unit 37 is opened to pass air therethrough by mechanically engaging the outer end 61 of pin 57 and moving the pin inwardly against the force of spring 58 to lift the disc 55 from edge 54. It will be noted that the axial movement of the pin 57 is guided by a cylindrical bearing member 62 in which the pin slides. Inward movement of the pin is limited by engagement of the enlarged end 61 with the bearing member. It will be noted also that the stem extends beyond the button 56 as at 63 for a purpose to be described later.

The construction of the insert comprising the second valve element 38 is substantially identical with that of unit 37 and therefore it will not be described in detail except in regard to the major points of difference. In general, the same reference characters have been applied to like parts of unit 38 except that the central pin is referred to as 71, the outermost end of the pin as 72 and the innermost end as 73.

The main valve stem 45 is counterbored as at 75 to receive a fitting 76 adapted to support both the second valve unit 38 and the poppet valve 39. The external dimensions of the fitting 76 are substantially smaller than the counterbore 75 so that a clearance indicated at 33a will result to communicate with the initial portion of passage 33. The position of the fitting 76 is determined by a plurality of spaced lug members 78 which abut the conical surface 79 as shown. The insert 38 is secured within the fitting by the threads 81 which engage the internal threads 82 at the outermost end of the fitting. It should be noted that the outer end 72 of pin 71 is cup-shaped so as to receive the end 63 of pin 57 and that a slight clearance indicated at c, in Figure 3, normally exists between the end face of extension 63 and the bottom of cup 72.

The poppet valve 39 is housed within the space defined by the inner end 85 of the fitting 76 and by an end cap member 86 threaded onto the fitting 76 as shown. The valve unit comprises an annular disc 87 of rubber seated within a recess in the end face 85 of the fitting, the disc providing a seat for the sharp edge 88 of a movable cup 90 which is urged into engagement with the annular disc by a coil spring 91 compressed between the annular flange 92 of the cap member and the flange 93 of the cup 90. The action of the poppet valve is such that whenever the force exerted on the cup by the air in chamber 42 exceeds the combined force of the spring 91 and the air in chamber 94 the cup lifts up and permits air to pass into the chamber 94 and from there into passage 34 and finally into the outer compartment 21. The cup 90 will drop into sealing position as soon as the difference in air pressures on each side of the cup is less than the force exerted on the cup by spring 91. The spring thus operates to maintain the desired difference in pressures between the two compartments and usually has such characteristics as to produce a difference of 15 pounds of air.

In operation the tire 10 and safety tube 20 are mounted on the rim and the washer 31 is drawn tight against the rim. Initially the valve units have the positions shown in Figure 3. The air nozzle 41 is brought against the end of the valve with the pin 40 of the nozzle engaging the pin 57 of valve unit 37. The nozzle moves pin 57 a sufficient amount to take up the clearance $c$ and cause pin 57 to engage pin 71 of unit 38. In this step the dimensions of pins 40, 57 and 71 are such that the end 73 of pin 71 fails to contact the cup member 90 allowing it to remain in contact with the disc 87. Valve units 37 and 38 are thus opened while unit 39 remains closed. Air under a pressure of about 40 pounds then is passed through valve unit 37, through the passage 31a between fitting 76 and the valve stem 45 and through passage 33 into the safety tube 20. Air at this same pressure of 40 pounds also passes through valve unit 38 into the chamber 42 to exert a pressure on the poppet valve member 90 and opens the valve until the air pressure in chamber 94 and passage 34 just exceeds 25 pounds. When this occurs the valve 39 is closed by the spring 91. A pressure of 40 pounds in compartment 22 and a pressure of 25 pounds in compartment 21 is thus produced. The air nozzle 41 is then withdrawn and the valve elements return to their positions of Figure 3.

When it is desired to deflate the tire and remove it from the rim, a nail or other suitable instrument is used to depress pin 57 of unit 37 to the full extent, see Figure 5. When pin 57 is given this overtravel, as compared with the movement shown in Figure 4, it will cause pin 71 to lift the poppet valve member 90 to open position and air will be free to escape from both compartments. If a blowout should occur with an explosive release of air from both compartments, the poppet valve will momentarily open, but since valves 37 and 38 will remain closed there is no possibility of air escaping from the inner compartment 22 and the tube 20 will continue to support the tire.

As mentioned above, the valve is usually used when the pressure of the inflating air can be set to the same pressure which it is desired to be maintained in tube 20. If air at a greater pressure is to be used it is desirable that the passageway for air through valve unit 37 be greatly restricted in comparison with the passageways leading to the outer and inner compartments, and that the tire be inflated slowly with the pressure in the inner compartment being tested frequently. If this is done the excess pressure of the air source will not blow the poppet valve open to produce an undesirably high pressure in the outer compartment.

While a preferred form of the invention has been described, various modifications will occur to those skilled in the art without departing from the spirit and scope of the invention, the essential features of which are summarized in the claims below.

I claim:

1. A valve construction adapted to be used with a tire whose interior is divided into an inner compartment and an outer compartment whereby air will be retained within said inner compartment to support said tire in the event of a blow-out with an explosive loss of air from said outer compartment, said valve comprising a central hollow stem, a first valve unit disposed within said stem, a second valve unit disposed in said stem and mechanically connected to said first unit whereby said units are opened and closed simultaneously, a chamber between said units and a passage leading from said chamber to said inner compartment, a third valve unit disposed in said stem, a second chamber between said second and third valve units and communicating with said first chamber when said first and second valve units are open, a third chamber on the opposite side of said third valve unit and a passage leading from said third chamber to said outer compartment, said third unit comprising a member and a spring normally urging said member into closed position, said member being movable into open position by the air pressure in said second chamber whenever such pressure exceeds the air pressure in said third chamber by an amount sufficient to overcome the force of said spring whereby the pressure of the air in said third chamber and in said outer compartment is maintained at a lower value than the air in said first and second chambers and in said inner compartment, said member also being movable to open position by mechanical contact with said second valve unit when said second unit is moved radically beyond its normal open position whereby the air in said inner and outer compartments may be released simultaneously and the tire deflated.

2. A valve construction according to claim 1 in which said stem has a restricted orifice whereby said passage of air into said first chamber is restricted as compared with the passage from said first chamber into said second chamber and said inner compartment.

3. A valve construction adapted to be used with a tire whose interior is divided into an inner compartment and an outer compartment whereby air will be retained within said inner compartment to support said tire in the event of a blow-out with an explosive loss of air from said outer compartment, said valve comprising a central hollow stem, a first valve unit disposed within said stem, a second valve unit disposed in said stem and mechanically connected to said first unit whereby said units are opened and closed simultaneously, a chamber between said units and a passage leading from said chamber to said inner compartment, a third valve unit disposed in said stem, a second chamber between said second and third valve units and communicating with said first chamber when said first and second valve units are open, a third chamber on the opposite side of said third valve unit and a passage leading from said third chamber to said outer compartment, said third unit comprising a member and means normally urging said member into closed position, said member being movable into open position by the air pressure in said second chamber whenever such pressure exceeds the air pressure in said third chamber by an amount sufficient to overcome the force of said means whereby the pressure of the air in said third chamber and in said outer compartment is maintained at a lower value than the air in said first and second chambers and in said inner compartment, said member also being movable to open position by mechanical contact with said second valve unit when said second unit is moved radically beyond its normally open position whereby the air in said inner and outer compartments may be released simultaneously and the tire deflated.

References Cited in the file of this patent

UNITED STATES PATENTS

| | | |
|---|---|---|
| 2,122,740 | Eckenroth | July 5, 1938 |
| 2,513,817 | Pennington | July 4, 1950 |
| 2,608,235 | Wyman | Aug. 26, 1952 |